United States Patent [19]

Suzuki et al.

[11] 4,012,918
[45] Mar. 22, 1977

[54] SUBMARINE CABLE LAYING SYSTEM

[75] Inventors: Kinya Suzuki; Kenji Mori, both of Tokyo; Yasuo Takeuchi; Masao Torii, both of Yokohama; Hiroji Takahashi; Ryozo Yamaichi, both of Tokyo, all of Japan

[73] Assignees: Nippon Telegraph and Telephone Public Corporation, Tokyo; Sumitomo Electric Industries, Ltd., Osaka; Nippon Electric Company, Ltd., Tokyo, all of Japan

[22] Filed: July 3, 1975

[21] Appl. No.: 593,134

[30] Foreign Application Priority Data

Oct. 2, 1974 Japan .................... 49-114236

[52] U.S. Cl. ..................... 61/107; 61/63; 235/151

[51] Int. Cl.[2] ............... E02F 5/14; G05B 11/16; G05D 3/04; G05D 15/01

[58] Field of Search .......... 37/98, DIG. 1; 61/72.1, 61/72.3, 72.4, 72.6, 63; 181/110, 140; 235/151.1, 150.2, 151; 340/3 R, 6 R, 8 FT

[56] References Cited

UNITED STATES PATENTS 3,624,369  11/1971  Kip .................................. 235/151.1
3,805,223  4/1974  Nilsson et al. .................... 340/3 R

OTHER PUBLICATIONS

Suzuki, K., *New Submarine Cable Burier with Guiding Equipment*, in Japan Telecomm. Rev., Apr. 1972, pp. 60-67.

*Primary Examiner*—R. Stephen Dildine, Jr.
*Attorney, Agent, or Firm*—Sughrue, Rothwell, Mion, Zinn & Macpeak

[57] ABSTRACT

A submarine cable laying system having an underwater cable laying device towed by a cable laying ship along the sea bottom is disclosed. The underwater cable laying device comprises a cable depressing wheel, a mechanism for elevating and lowering the cable depressing wheel, means detecting passage of repeaters and the like under said cable depressing wheel, and means for detecting the length of a part of the cable having been laid by the cable laying device. The output signals of the two detecting means are sent to a controlling device provided on said cable laying ship, and are so processed that the output signal from the controlling device can control the elevation or lowering of the cable depressing wheel automatically each time the repeaters or the like pass through the cable depressing wheel.

8 Claims, 5 Drawing Figures

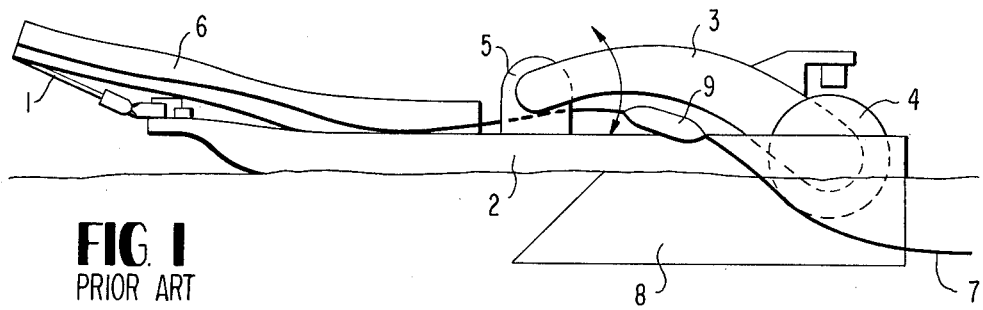
FIG. 1
PRIOR ART
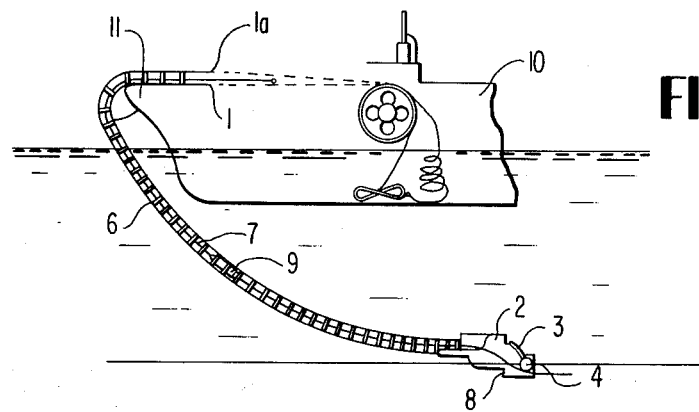
FIG. 2
FIG. 5
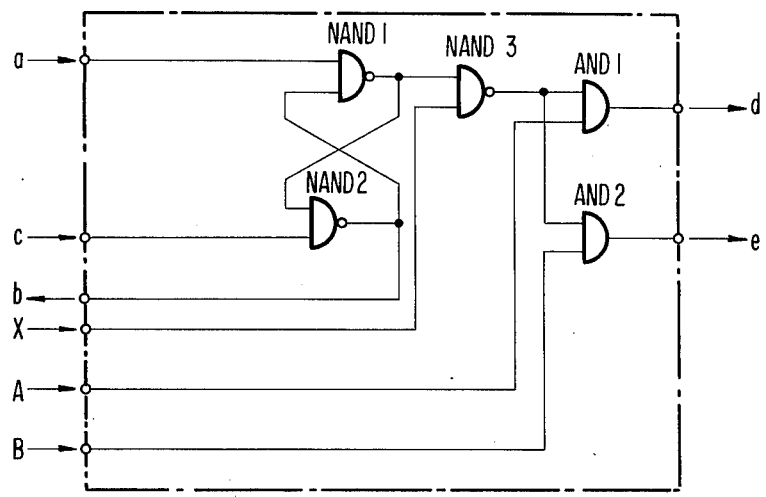

SUBMARINE CABLE LAYING SYSTEM

BACKGROUND OF THE INVENTION

This invention relates to devices for laying submarine cables, and more particularly to a specific device which is towed along the bottom of the sea and adapted to lay the cable in a buried manner.

Known is a device having cable depressing wheel means and adapted to force a submarine cable to be buried into the bottom of the sea. Such a device is connected to an end of a towing and controlling cable and towed by a cable laying ship along the bottom of the sea. The device comprises, beside of the cable depressing wheel, an arm for hoisting and descending the cable depressing wheel, a mechanism for operating the arm, and a plow secured to the bottom of the device. A submarine cable, which has repeaters and joining portions, is guided within a cable guide provided in combination with the towing and controlling cable between the device and the cable laying ship. When the cable laying ship advances at a predetermined speed, the plow of the device digs a trench in the bottom of the sea. Simultaneous therewith, the submarine cable is paid out from the ship, sent through the cable guide, dropped into the trench, and forced into a depth by means of the depressing wheel. Each time when the repeaters pass through the depressing wheel, the latter is temporarily hoisted under the remote control from on board of the cable laying ship, and then is descended to depress the cable again.

Thus, in the above described conventional device for laying submarine cable, it has been required to detect the passage of the repeaters through the depressing wheel by means of, for instance, a submersible television of a hydrophone, and to manually operate a control device on board of the cable laying ship thereby to drive the wheel hoisting arm. Such a procedure makes it difficult to bury a part of the cable neighboring the repeater of the cable into a predetermined depth.

SUMMARY OF THE INVENTION

With the above described disadvantage of the conventional cable laying device in view, it is a primary object of the present invention to provide a submarine cable laying system wherein the hoisting and descending of the cable depressing wheel can be attained automatically.

Another object of the invention is to provide a submarine cable laying system wherein the manual detection by television or hydrophone of the repeaters can be eliminated.

Still another object of the invention is to provide a submarine cable laying system wherein the manual operation of the control device on board of the cable laying ship can be entirely eliminated.

These and other objects of the present invention can be achieved by a submarine cable laying system comprising a cable laying device towed by a cable laying ship along the sea-bottom, and a controlling device provided on the cable laying ship, said cable laying device comprising a cable depressing wheel, a mechanism for elevating and descending said cable depressing wheel, means for detecting passage of repeaters and joining portions of the cable, and means for detecting the entire length of the cable laid by the cable laying device, whereby the desired laying of the cable can be realized when said controlling device processes signals from said two detecting means and operates said mechanism for elevating and descending said cable depressing wheel automatically.

The nature, principle, and utility of the invention will be more clearly understood from the following detailed description of the invention when read in conjunction with the accompanying drawings.

BRIEF DESCRIPTION OF THE DRAWINGS

In the drawings:

FIG. 1 is an explanatory diagram of a conventional cable laying device;

FIG. 2 is a diagram for explaining the operation of a submarine cable laying system according to the present invention;

FIGS. 4 and 5 are explanatory diagrams of the control system of this invention.

DETAILED DESCRIPTION

Figure 3:
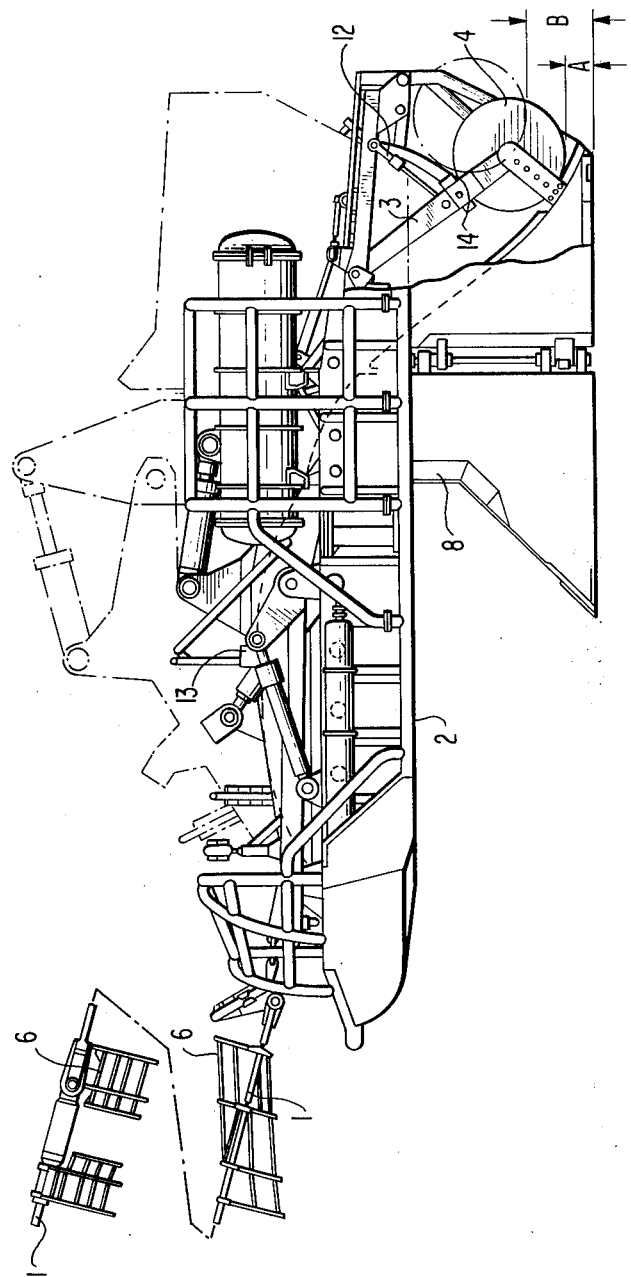
FIG. 3 is a profile view of a cable laying device constituting an important part of the submarine cable laying system.

As condusive to a better understanding of the present invention, a conventional cable laying device will first be described with reference to FIG. 1. The device generally designated by 2 is towed by a towing and control cable 1, the other end of which is secured to a cable laying ship (not shown). The device 2 is provided with a cable depressing wheel 4 which is mounted on an end of an arm 3 driven by an arm operating mechanism 5 so that the cable depressing wheel 4 is thereby moved upwardly or downwardly. A cable guide 6 is further provided between the device 2 and the cable laying ship (not shown), and a submarine cable 7 is passed through the cable guide 6. A plow 8 is also provided and secured to the bottom of the device 2. When the cable laying ship advances at a predetermined speed, the plow 8 of the cable laying device 2 digs a trench in the bed of the sea, and a part of the cable 7 paid out of the ship is depressed by means of the wheel 4 into the thus formed trench. In this case, however, if a repeater 9 of the communication cable 7 arrives at the position of the depressing wheel 4, the wheel must be elevated upwardly thereby permitting the repeater 9 to pass through the position. The elevation of depressing wheel 4 is attained by manually operating a controlling device on board of the ship and thereby operating the mechanism 5. After the passage of the repeater 9, the control device on the ship is again manually operated thereby to descend the depressing wheel 4 and to depress the cable into the trench at a predetermined pressure. The above described conventional device for laying submarine cable, however, has shortcomings in that the arrival of the repeater at the position of the depressing wheel must be detected by a submersible television or a hydrophone, and the control device on the ship must be manually operated to drive the wheel elevating mechanism. Furthermore, such a procedure makes it difficult to bury a part of the cable neighboring the repeater into a predetermined depth.

The present invention is intended to provide a submarine cable laying system whereby the above described shortcomings of the conventional device can be substantially eliminated. The invention will now be described with reference to FIGS. 2 through 4, wherein like parts as indicated in FIG. 1 are designated by like reference numerals. In FIG. 2 where the operation of the submarine cable laying system of the present invention is indicated schematically, numerals 1 and 1a designate a towing cable and a control cable, respectively, numeral 2 designates a cable laying device, numeral 3 a depressing wheel elevating and lowering arm, numeral 4 a depressing wheel, numeral 6 a cable guide, 7 a submarine cable, 8 a plow, 9 a repeater, and numeral 10 designates a cable laying ship. When the cable 7 is laid and buried in the sea bed, the cable laying ship 10 advances at a predetermined speed, and the submarine cable 7 and the repeaters 9 stored in the storage tank in the ship are paid out of the bow or stern 11 of the ship 10 through a cage-like cable guide 6 extended toward the cable laying device 2.

Referring now to FIG. 3, there is indicated an example of the cable laying device 2, wherein numeral 12 designates a hydraulic cylinder, numeral 13 a detecting device for repeaters, and numeral 14 designates a detecting device for the entire length of the submarine cable so far laid into the sea bed. The depressing wheel elevating and lowering arm 3 is driven by the hydraulic cylinder 12 into three positions consisting of an elevated position, a neutral position, and a lowered position.

Figure 4:
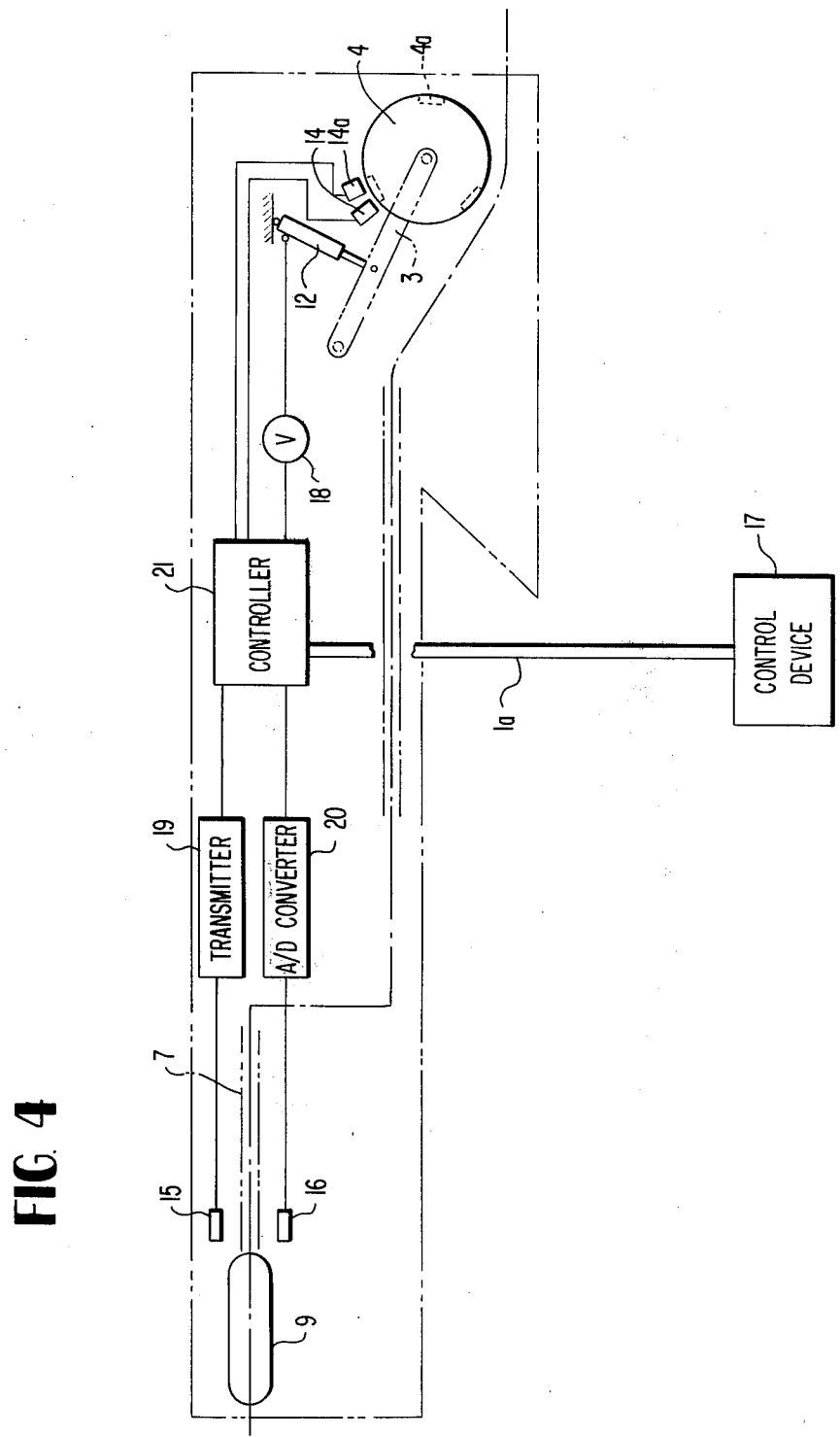

An automatic driving system of the depressing wheel elevating and lowering arm 3 will now be described with reference to FIG. 4. A high-frequency electrical output delivered from a transmitter 19 in FIG. 4 is supplied to an acoustic generator 15, and a supersonic wave delivered from the acoustic generator 15 is emitted into the sea toward an acoustic receiver 16. In the case where no repeater exists in the path of the supersonic wave, a signal having a greater magnitude is generated in the receiver 16, and when a repeater exists in the passage, a signal of a smaller magnitude is obtained from the receiver 16. The signal from the receiver 16 is analog-to-digital converted in a convertor 20, and the output thereof is sent to a controller 21 provided in the cable laying device 2. In the controller 21, the output from the converter 20 is formed into a voltage adapted for telemetering, and then is frequency modulated. The thus modulated output from the controller 21 is then sent through a control cable 1a to a control device 17 provided on the cable laying ship. In the control device 17, the frequency-modulated signal is demodulated, and a part thereof is used for igniting an indicating lamp and also for sounding a buzzer, while the remaining part thereof is sent to a circuit shown in FIG. 5. Devices 14 and 14a for detecting the length of the cable that has been buried into the bottom of the sea, contain coils wound differentially. Thus, when a magnetic body 4a secured on the outer periphery of the cable depressing wheel 4 in a manner spaced apart by a predetermined distance passes through the nighborhood of the detecting device 14 and 14a, the reactances of the coils are varied, and an electric signal thereby created is sent to the the controller 21 in the device 2. The signal is pulse-modulated and then frequency-modulated, the resultant signal being sent through the control cable 1a to the control device 17 on the cable laying ship. The control device 17 demodulates the signal, and the thus dimodulated signal is on one hand used to indicate forward or reverse operation of a counter, while on the other hand the signal is passed through various circuits in the control device 17 and finally delivered to another counter wherein the length of a part of the cable so far buried in the sea bottom is counted.

The construction and the fundamental principle of the operation of the circuit shown in FIG. 5 will now be explained. In the drawing, $a$ designates an output signal from the repeater detecting device, which is ordinally in a high level (hereinafter called H) and is brought into a low level (hereinafter called L) when a repeater passes through the position of the depressing wheel. $b$ designates an output signal to be sent to the buried cable length counting circuit. The signal $b$ is ordinally in H, but is held in L after the passage of a repeater under the depressing wheel until an input signal $c$ becomes L. The input signal $c$ is an output of the buried cable length counting circuit, and is ordinarily in H but instantaneously brought into L when a predetermined cable length is counted in the buried cable length counting circuit after the same circuit has received the output signal $b$ in L. A and B designate signals obtained from a manual switch in the controlling device on the ship, and the signal A becomes H when the depressing wheel is elevated while the signal B becomes H when the same wheel is lowered. During the most part of the operation, the input signal A is kept in L and the input signal B is kept in H. $d$ designates an output signal to instruct elevation of the depressing wheel, and $e$ designates another output signal to instruct lowering of the same wheel. When either one of the output signals $d$ and $e$ is H, the signal causes an electromagnetic valve 18 to operated thereby operating the hydraulic cylinder 12 which in turn operates the cable depressing wheel in the corresponding direction. X designates a signal which is L at the time of manual control and H at the time of automatic control.

In operation, an operation change-over switch is set to manual operation until the cable laying device is settled on the sea bottom and the submarine cable is partly laid therein with the cable depressing wheel being elevated and lowered depending on which one of the signals A and B is in H. When the operation change-over switch is set to manual operation, the signal X becomes L as described above, and the output of NAND3 is bought into H regardless of the condition of the signal $a$, $b$ and $c$ and also NAND1 and NAND2. In this state, if the input signal A is H, the output signal $d$ of AND 1 becomes H because of two inputs thereof being H and the elevation of the cable depressing wheel is instructed. On the other hand, if the input signal B is H, the output signal $e$ of AND2 is brought into H and the lowering of the same wheel is instructed. Thus, it is apparent that when the operation change-over switch is set to manual operation, the elevation and lowering of the cable depressing wheel can be controlled from the manual switch in the control device on board the ship.

At the suitable time in the cable laying operation, the operation change-over switch is set to automatic operation. During the time when no repeater has yet arrived under the cable depressing wheel, the signals $a$, $c$, and X are all in H state, thus making the output of NAND3 H. When a repeater arrives under the cable depressing wheel, the signals $a$, $c$, and X become L, H, and H, respectively, whereby the output of NAND3 is brought into L. After the passage of the repeater and before the signal $c$ becomes L, the signals $a$, $c$, and X are again in H state, and the output of NAND3 is brought into L. After the passage of the repeater and when the signal $c$ becomes L, the output of NAND3 is brought into H, and this state of the NAND3 is maintained even after the signal $c$ returns to H. At this state, all the conditions of the circuit are similar to those in the original state, and if the signals A and B are held in L and H states, respectively, the output signals d, and e are brought into L and H, respectively, before the passage of the repeater; into H and L from the time of the passage of the repeater to the instant of a predetermined length of the submarine cable being laid; and into L and H, respectively, after the same instant, because of the combination of the signals A and B and the output signal of the NAND3, whereby the operation of the cable depressing wheel can be automatically controlled in the lowered, neutral, and again lowered positions.

As will be apparent from the foregoing description, according to the present invention, the signals from the repeater passage detecting device and the buried cable length detecting device provided in the cable laying device are transmitted to the controlling device on the cable laying ship, mathematically processed therein, and the results are employed for automatically controlling the operation of the hydraulic cylinder in the cable laying device, whereby the necessity of constant observation of the repeaters and the like as in the conventional cable laying system can be substantially eliminated and the efficiency of the submarine cable laying operation can be elevated significantly.

We claim:

1. In a submarine cable laying system comprising a cable laying device towed along the sea-bottom by a cable laying ship and a controlling device on the cable laying ship, said cable laying device comprising a cable depressing wheel and a mechanism responsive to said controlling device for elevating and lowering said cable depressing wheel, the improvement comprising:

first detecting means on said cable laying device for detecting the passage of repeaters and the like under said cable depressing wheel and producing a first signal, second detecting means on said cable laying device for detecting the length of a part of the cable having been laid by said cable laying device after detection of the passage of a repeater and the like by said first detecting means and producing a second signal, and control circuit means connected to receive said first and second signals for generating control signals to said controlling device to cause the automatic elevation and lowering of said cable depressing wheel each time a repeater and the like passes under said cable depressing wheel.

2. In a submarine cable laying system as set forth in claim 5, wherein said first detecting means for detecting the passage of repeaters and the like comprises:

an acoustic generator, and an acoustic receiver connected to said control circuit means so that an output signal at a first level is supplied to said control circuit means when no repeater and the like passes between the acoustic generator and the acoustic receiver and an output signal at a second level is supplied to said control circuit means when a repeater and the like passes between the acoustic generator and the acoustic receiver.

3. In a submarine cable laying system as set forth in claim 5 wherein said second detecting means for detecting the length of a part of the cable having been laid by the cable laying device comprises:

two coils wound in a differential manner, and a plurality of magnetic bodies secured on the outer periphery of the cable depressing wheel in a spaced apart relation, said coils producing an output signal which is ordinarily at a first level but is at a second level when a predetermined length of the cable is detected to be laid after the passage of the repeater and the like under the cable depressing wheel is supplied to said control circuit means.

4. In a submarine cable laying system as set forth in claim 5 wherein said control circuit means comprises a logic circuit which receives output signals from said first and second detecting means and delivers a first control signal for elevating the cable depressing wheel in response to said first signal from said first detecting means and a second control signal for lowering the cable depressing wheel in response to said second signal from said second detecting means, said logic circuit providing an activating signal to said second detecting means in response to said first signal.

5. In a submarine cable laying system as set forth in claim 1 wherein said controlling device is manually operable to provide a third signal representing an elevate command, a fourth signal representing a lower command and a fifth signal representing a changeover command to said control circuit means, said changeover command signal permitting the selection between manual and automatic control of said cable depressing wheel.

6. In a submarine cable laying system as set forth in claim 5 wherein said control circuit means comprises a logic circuit which receives said first, second, third, fourth and fifth signals and produces a first control signal for elevating the cable depressing wheel in response to said first signal when said fifth signal is present or in response to said third signal when said fifth signal is absent, and a second control signal for lowering the cable depressing wheel in response to said second signal when said fifth signal is present or in response to said fourth signal when said fifth signal is absent, said logic circuit providing an activating signal to said second detecting means in response to said first signal.

7. In a submarine cable laying system as set forth in claim 6 wherein said first detecting means for detecting the passage of repeaters and the like comprises:

an acoustic generator, and an acoustic receiver connected to said control circuit means so that an output signal at a first level is supplied to said control circuit means when no repeater and the like passes between the acoustic generator and the acoustic receiver and an output signal at a second level is supplied to said control circuit means when a repeater and the like passes between the acoustic generator and the acoustic receiver.

8. In a submarine cable laying system as set forth in claim 7 wherein said second detecting means for detecting a length of a part of the cable having been laid by the cable laying device comprises:

two coils wound in a differential manner, and a plurality of magnetic bodies secured on the outer periphery of the cable depressing wheel in a spaced apart relation, said coils producing an output signal which is ordinarily at a first level but is at a second level when a predetermined length of the cable is detected to be laid after the passage of the repeater and the like under the cable depressing wheel is supplied to said control circuit means.

* * * * *